Dec. 21, 1965     B. C. GRAY     3,224,329

STRAIGHT-EDGE OPTICAL DEVICE

Filed Dec. 10, 1963     2 Sheets-Sheet 1

INVENTOR.
Billy C. Gray
BY Harry M. Saragovitz,
Edward J. Kelly &
Herbert Berl

Dec. 21, 1965   B. C. GRAY   3,224,329
STRAIGHT-EDGE OPTICAL DEVICE
Filed Dec. 10, 1963   2 Sheets-Sheet 2
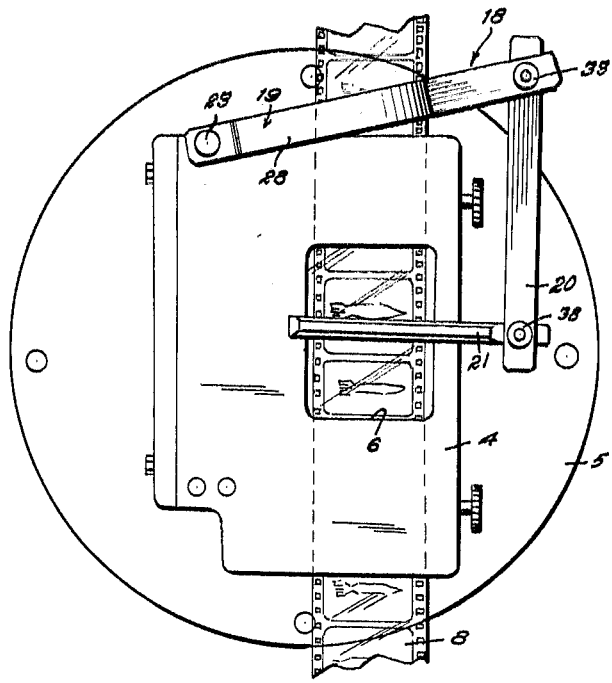
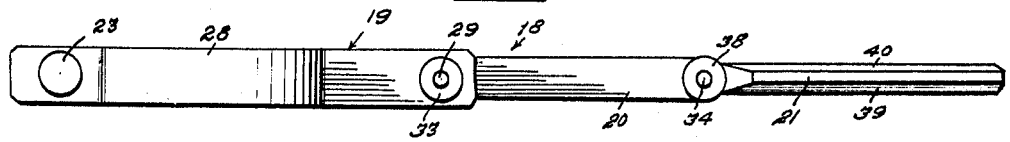
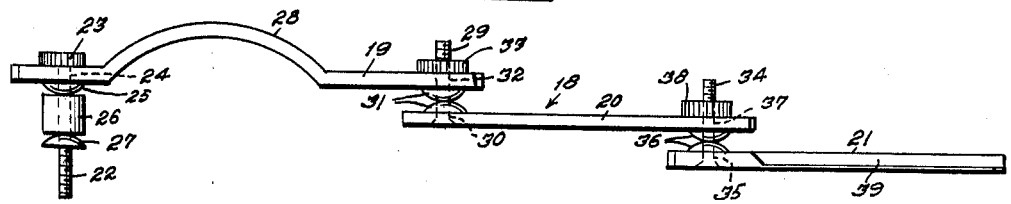
INVENTOR.
Billy C. Gray
BY Harry M. Saragovitz,
Edward J. Kelly &
Herbert Berl

United States Patent Office 3,224,329
Patented Dec. 21, 1965

3,224,329
STRAIGHT-EDGE OPTICAL DEVICE
Billy C. Gray, 720 Baca Road, Las Cruces, N. Mex.
Filed Dec. 10, 1963, Ser. No. 329,594
3 Claims. (Cl. 88—24)
(Granted under Title 35, U.S. Code (1952), sec. 266)

The invention described herein may be manufactured and used by or for the Government for governmental purposes, without the payment to me of any royalty thereon.

This invention relates to a straight-edge optical device and more particularly to a device for use with a film projector so that the film reader can read the angle of an image on the film by use of a V-angle or grid-angle.

Normally, data processors read the position of an image on a film frame by projecting the image through a magnifying lens and onto a screen, where a V-angle, similar to a drafting machine is used to measure the position and angle of the image. This is especially the case when processing missile data.

This procedure worked very well as long as the image as seen on the screen was well defined. However, sections of film, or sometimes whole rolls of film are underexposed. When this situation arises the image projected is very difficult to distinguish and makes an accurate measurement of the angle impossible. This results in the loss of much valuable data and in some instances has resulted in the loss of all attitude data of a missile test.

In brief, the straight-edge device of the invention is composed of three bars that are spring tensioned at their pivots and the bars will make three, three-hundred and sixty degree turns. The straight-edge is aligned with the image, for instance a missile, attitude shown on the film frame at the projector's head. The resultant shadow cast on the viewing screen allows the attitude to be measured by the V-angle at the screen even though the image projected is invisible thereon.

It is a primary object to provide a device whereby the attitude of an image on a film, which is projected onto a screen, may be measured even though the projected image is not clearly defined.

It is another object to provide a straight edge that is pivotally mounted at the projection window of a film projector that can be aligned with an image through a rotation of three-hundred and sixty degrees.

It is still another object to provide a simple straight-edge optical device to aid in reading the attitude of an image on a film that is constructed of three pivoted bars and whereby each bar is capable of a three-hundred and sixty degree rotation about its respective pivot.

The specific nature of the invention as well as other objects and advantages thereof, will clearly appear from a description of a preferred embodiment as shown in the accompanying drawings in which:

FIG. 2 is a top plan view of a film projector head with the straight-edge attached;

FIG. 3 is a top plan view of the straight-edge device, the bars being extended; and, FIG. 4 is an edge elevation of the device.

Figure 1:
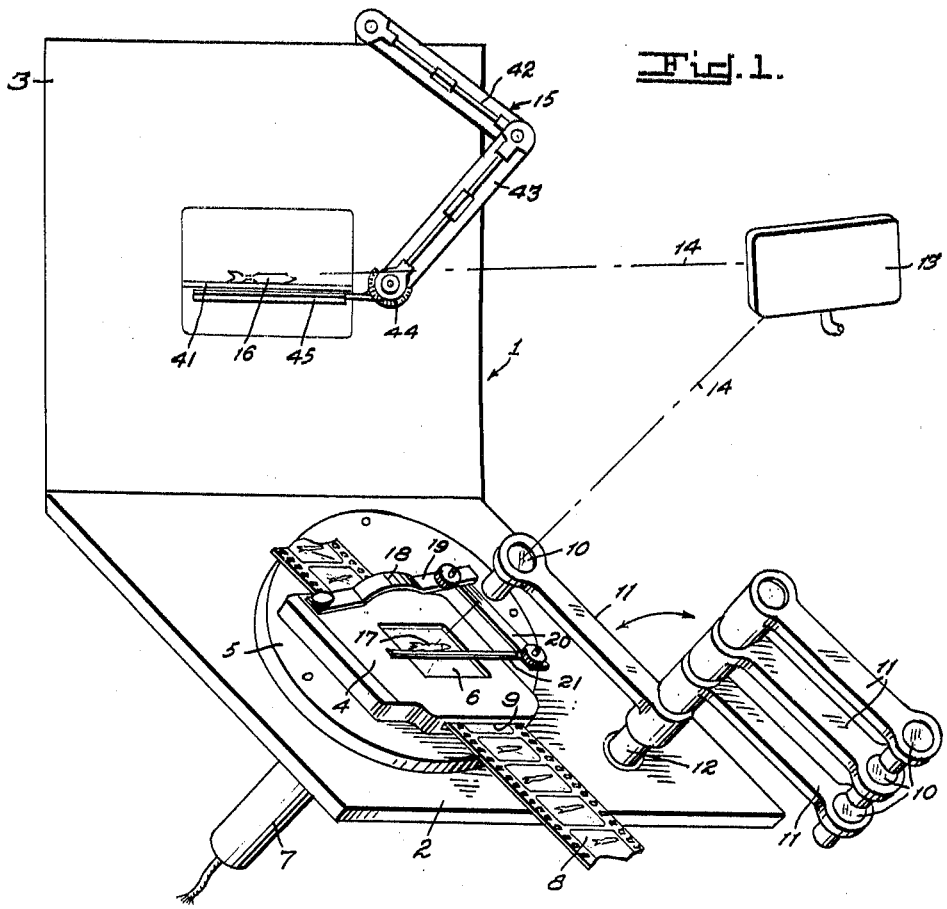
FIG. 1 is a somewhat schematic perspective view of a film projection apparatus and with the straight-edge device of the invention applied thereon.

Referring more particularly to the drawings and especially to FIG. 1, the invention is illustrated as applied to a film projection apparatus, which is generally designated by reference character 1. The apparatus is shown schematically with operating elements such as film feeders and winders left out for the sake of clarity. The apparatus consists of a base 2 and a screen 3. A film projection head 4 is fixed on a plate 5 which is fastened on base 2.

Head 4 is provided with a window 6 and a source of light 7. The light source 7 is secured to the under side of base 2.

The motion picture film 8 which contains the image is fed throgh a slot 9 in head 4 so that a frame is positioned directly below window 6 as seen in FIG. 1.

A series of lenses 10 for magnifying the projection of the image on the screen 3 is carried by arms 11 pivotally mounted on a post 12 mounted on base 2.

A mirror 13 deflects the light rays 14 from light source 7 onto screen 3.

Means for measuring the angle of an image projected onto screen 3 consists of a modern drafting device indicated generally by 15. This device is of the type illustrated in U.S. Patent 2,454,380.

The device 15 is provided with pivoted arms 42 and 43, a protractor 44 for measurement of angles and a straight bar 45. This device may be adjusted in any position and bar 45 is pivoted for rotation through 360 degrees.

The measuring device shown is by way of example, since any other device capable of measuring angles may be employed if expedient.

The image on film 8 is indicated as at 17 while the projected image on screen 3 is indicated by 16.

The straight edge device of the invention is generally denoted by reference character 18 and is shown in greatly enlarged scale in FIGS. 3 and 4.

Device 18 consists chiefly of three bars as follows: a main support arm 19, a middle support arm 20 and a straight-edge arm 21.

Straight-edge 18 is secured to head 4 by removing one of the head fastening bolts (not shown) and substituting a threaded bolt 22 which has a circular knurled head 23 through a hole 24 at one end of main support arm 19. A semicircular spring washer 25 is placed on bolt 22 adjacent the lower surface of arm 19, then a spacer 26, then another semicircular spring washer 27 is placed adjacent the underside of the spacer 26 and the assembly is then screwed into the opening (not shown) from which the head bolt was removed, bolt 22 then acts as the pivot around which arm 19 can rotate 360°. Arm 19 is curved as at 28 as shown to provide a hand hold.

Middle support arm 20 is fastened to the other end of main support 19 at its underside. A threaded stud 29 passes through a hole 30 in bar 20 and has a pair of semicircular washers 31 thereon. The stud 29 then passes through a hole 32 in the free end of bar 19 and a knurled nut 33 fastens the assembly together. Bar 20 is capable of 360° rotation about bar 19.

Straight edge bar 21 is fastened to the other end of bar 20 in a similar manner by a threaded stud 34 passing through a hole 35 in bar 21, a pair of semicircular spring washers 36 and a hole 37. The assembly is fastened together by a knurled nut 38. Bar 21 is capable of 360° rotation about bar 20. Bar 21 is beveled at each of its edges as at 39 and 40. (See FIG. 3.)

Operation

The film to be studied is fed into slot 9 by the usual mechanism (not shown) until a frame is aligned with window 6. Light 7 is turned on and a magnifying lens 10 of the desired magnification is swung into the light ray path 14 from light 7. The light rays pass through film 8, window 6, lens 10 and are reflected by mirror 13 whereupon they are projected onto screen 3. The image 17 on film 8 will appear on screen 3 as at 16. To read the angle of image 17, the arm 45 of the device 15 is aligned therewith as seen in FIG. 1 and the angle is read. This procedure works well as long as the projected image 16 is well defined.

Some light rays are lost in their travel to screen 3 due to surroundings and reflections by mirror 13. Also the film may be underexposed and the image 17 will not be well defined. This makes accurate measurement of the angle of the image difficult and thus results in loss of much valuable data and if the film was of a missile test, all attitude data of the test.

However the film reader by looking directly into the glass window 6 can generally clearly see the image 17, the reason being that the film is very close to the light 7 where a greater amount of light is concentrated. Next the straight-edge bar 21 is aligned parallel to the image 17. This is done by loosening knurled head 23, nut 33 and nut 38 and rotating bars 19, 20 and 21 until the said parallel adjustment is attained, then head 23 and nuts 33 and 38 are tightened.

Now the reflection of bar 21 will appear on screen 3 and will appear in the same alignment as at window 6. Therefore, even if the image 16 disappears completely, the reflection 41 will remain clear and the arm 45 of device 15 may be aligned parallel with the reflection 41 of bar 21 and the attitude angle read on protractor 44.

Bars 19, 20 and 21 being rotatable 360° about their pivots permit adjustment of bar 21 to any conceivable angle within the plane. Therefore, any angle that an object, on the film being projected, might assume, can be duplicated by the device.

It is to be understood that the form of the invention herewith shown and described is to be taken as a preferred example of the same, and that various changes in the shape, size and arrangement of parts may be resorted to, without departing from the spirit of the invention, or the scope of the subjoined claims.

What is claimed is:

1. In combination with a film projector including a base, a head on said base, a window in said head, there being a film slot in said head, a source of light secured under said base and in alignment with said window, a mirror arranged to reflect light rays from said light onto said screen and an angle measuring member rotatable about said screen; a straight edge secured adjacent said head and rotatable about said window whereby said straight-edge may be aligned in parallel relationship with an image on a film in said slot and its shadow projected onto said screen and in the same alignment thereon as at said window whereby said angle measuring device may be aligned parallel with the shadow of said straight edge on said screen and its attitude measured by said angle measuring member.

2. A device as set forth in claim 1 wherein said straight-edge comprises a first bar pivoted at one of its ends adjacent said head, a second bar pivoted at one of its ends to the free end of said first bar, a third bar pivoted at one of its ends to the other end of said second bar, said bars being rotatable about their respective pivots through 360° with respect to each other, and spring-loaded means associated with said pivoted ends for locking said bars against rotation.

3. A device as set forth in claim 2 wherein said third bar is beveled along each of its edges.

References Cited by the Examiner
UNITED STATES PATENTS

| | | | |
|---|---|---|---|
| 2,192,529 | 3/1940 | Thomas et al. | 88—24 |
| 2,364,153 | 12/1944 | MacLeod | 33—79 X |
| 2,592,264 | 4/1952 | Fultz | 88—24 X |
| 2,759,267 | 8/1956 | Wood et al. | 88—24 X |

NORTON ANSHER, *Primary Examiner.*

EVON C. BLUNK, *Examiner.*

H. H. FLANDERS, *Assistant Examiner.*